(12) United States Patent
 Murakami

(10) Patent No.: US 8,127,161 B2
(45) Date of Patent: Feb. 28, 2012

(54) DATA PROCESSING APPARATUS

(75) Inventor: Daisuke Murakami, Kyoto (JP)

(73) Assignee: Panasonic Corporation, Osaka (JP)

( * ) Notice: Subject to any disclaimer, the term of this patent is extended or adjusted under 35 U.S.C. 154(b) by 594 days.

(21) Appl. No.: 12/250,123

(22) Filed: Oct. 13, 2008

(65) Prior Publication Data

US 2009/0125738 A1 May 14, 2009

(30) Foreign Application Priority Data

Nov. 14, 2007 (JP) ................................. 2007-295715

(51) Int. Cl.
*G06F 1/26* (2006.01)
*G06F 13/16* (2006.01)

(52) U.S. Cl. ........................................ 713/322; 710/200
(58) Field of Classification Search .................... 713/322
See application file for complete search history.

(56) References Cited

U.S. PATENT DOCUMENTS

| 5,740,404 | A | | 4/1998 | Baji | |
|---|---|---|---|---|---|
| 6,460,125 | B2 | * | 10/2002 | Lee et al. | 711/167 |
| 6,564,329 | B1 | * | 5/2003 | Cheung et al. | 713/322 |
| 7,007,181 | B2 | * | 2/2006 | Yamada | 713/320 |
| 7,085,941 | B2 | * | 8/2006 | Li | 713/300 |
| 7,155,618 | B2 | * | 12/2006 | Moyer et al. | 713/320 |
| 7,275,171 | B2 | * | 9/2007 | Kizer et al. | 713/400 |
| RE39,963 | E | * | 12/2007 | Cheung et al. | 713/322 |
| 7,640,446 | B1 | * | 12/2009 | Donovan | 713/322 |
| 7,657,764 | B2 | * | 2/2010 | Jorgenson et al. | 713/300 |
| 2005/0055592 | A1 | * | 3/2005 | Velasco et al. | 713/322 |

FOREIGN PATENT DOCUMENTS

JP 2004-074623 A 3/2004

* cited by examiner

*Primary Examiner* — Ryan Stiglic
(74) *Attorney, Agent, or Firm* — McDermott Will & Emery LLP

(57) ABSTRACT

An access stop control apparatus is provided in a resource control apparatus so that reception of access from a master apparatus is temporarily stopped during changing of a clock frequency and the clock frequency is changed at safe timing. Thereby, the operation of the master apparatus does not need to be stopped during changing of the clock frequency and a period for which access to a resource is stopped can be suppressed. Therefore, execution of an application requiring real-timeness is not affected.

9 Claims, 11 Drawing Sheets

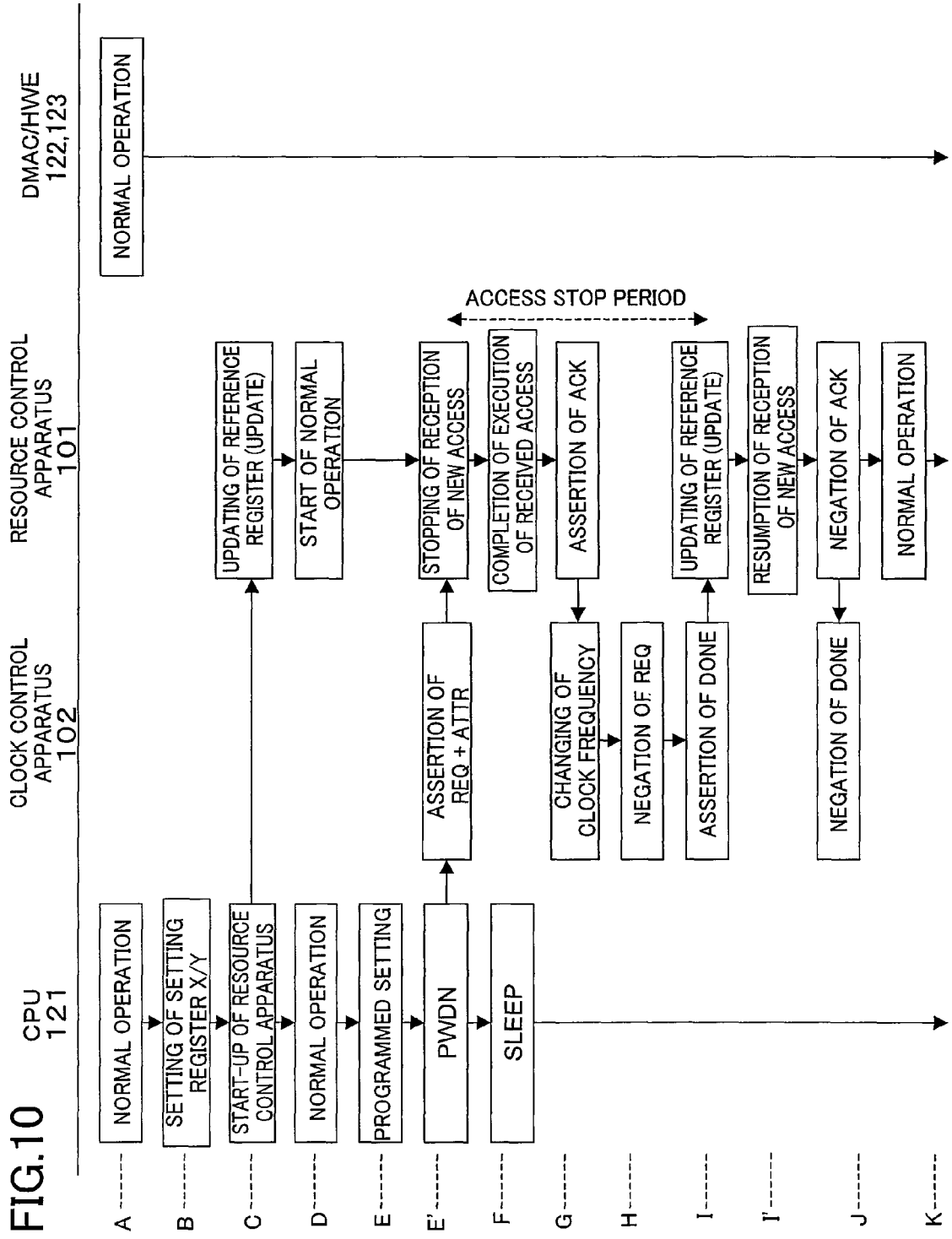

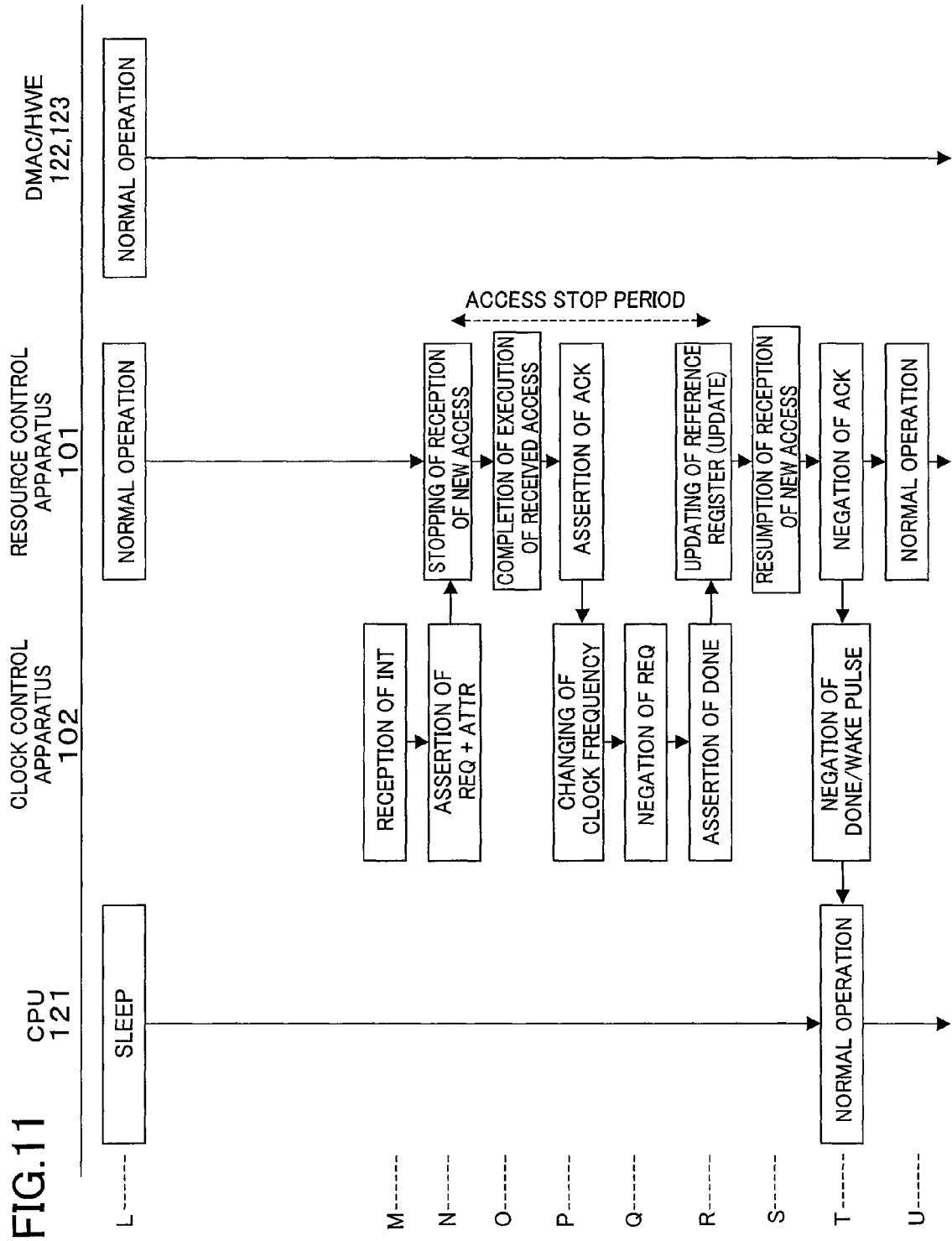

DATA PROCESSING APPARATUS

BACKGROUND OF THE INVENTION

1. Field of the Invention

The present invention relates to a data processing apparatus that allows lower power consumption in a system for controlling a resource having an AC parameter, such as a nonvolatile semiconductor memory, without reducing the performance of access to the resource, by reducing the frequency of a system clock signal while requesting access to the resource.

2. Description of the Related Art

For memory devices, such as a Synchronous Dynamic Random Access Memory (SDRAM) and the like, a time constraint on an interval between each command in a command control for access is defined as an AC parameter. This AC parameter is defined in terms of time. However, since a circuit for controlling a memory device is operated with reference to a clock signal, the circuit generally converts the AC parameter into the number of clock cycles and performs a control using the number of clock cycles.

In a system including an SDRAM, when the clock frequency of the system is reduced so as to achieve lower power consumption or when the clock frequency is increased so as to achieve an operation in a high-speed mode, the number of clock cycles obtained by conversion of the AC parameter differs between before and after the changing of the clock frequency, so that the number of clock cycles also needs be changed, depending on the change in the clock frequency. In this case, a complicated circuit configuration is required so as to change the number of clock cycles when a memory device is being accessed. Therefore, it is necessary to temporarily stop access to the memory device so as to change the number of clock cycles.

According to a conventional technique, a processor stops access to a memory device, confirms the stop of an operation of another access master, such as a Direct Memory Access Controller (DMAC) or the like, using software, and changes the set number of clock cycles, and thereafter, instructs a clock control section to change the clock frequency, and resumes access to the memory device after confirmation of the change of the clock frequency, thereby making it possible to change the clock frequency (see Japanese Unexamined Patent Application Publication No. 2004-074623).

SUMMARY OF THE INVENTION

When the clock frequency is changed by software as described above, all masters that are accessing a resource need to be stopped. Therefore, the clock frequency cannot be changed when an application requiring real-timeness is being executed. Also, a process of stopping the operations of all masters, or the like is required. Therefore, a complicated procedure for executing software, a large number of software codes, and a large memory capacity for storing the software codes are required, resulting in an increase in cost. Also, access from the processor to a resource needs to be stopped. Therefore, the software codes for changing the clock frequency cannot be placed on the resource, so that the code placement needs to be limited. Also, in a system including a plurality of processors that operate separately, it is difficult for the processors to mutually stop their operations, so that the clock frequency cannot be safely changed.

As described above, in the conventional data processing apparatus, continuation of an application requiring real-timeness and the changing of the clock frequency for a reduction in power consumption cannot be simultaneously achieved.

An object of the present invention is to provide a data processing apparatus that can reduce power consumption of a system by allowing changing of the clock frequency even when an application requiring real-timeness is being executed.

To achieve the object, in the present invention, an access stop control apparatus for temporarily stopping access is provided in a resource control apparatus for controlling a resource. When a clock frequency is changed, procedures for stopping access, changing the number of clock cycles obtained by conversion of an AC parameter, changing the clock frequency, and resuming reception of access are automatically performed by hardware by communication with a clock control apparatus.

With this configuration, the operation of each master apparatus does not need to be stopped, i.e., may request access to a resource during changing of the clock frequency. The access stop control apparatus temporarily does not return a reaction to these access requests, thereby temporarily preventing occurrence of access to a resource.

According to the present invention, a clock frequency is changed while an influence on an application requiring real-timeness is suppressed to a minimum level, thereby making it possible to achieve lower power consumption of a system.

BRIEF DESCRIPTION OF THE DRAWINGS

FIG. 10 is a flowchart showing an exemplary operation (first half) of the exemplary configuration of FIG. 9.

FIG. 11 is a flowchart showing an exemplary operation (second half) of the exemplary configuration of FIG. 9.

DETAILED DESCRIPTION OF THE PREFERRED EMBODIMENTS

Hereinafter, embodiments of the present invention will be described with reference to the accompanying drawings.

First Embodiment

Figure 1:
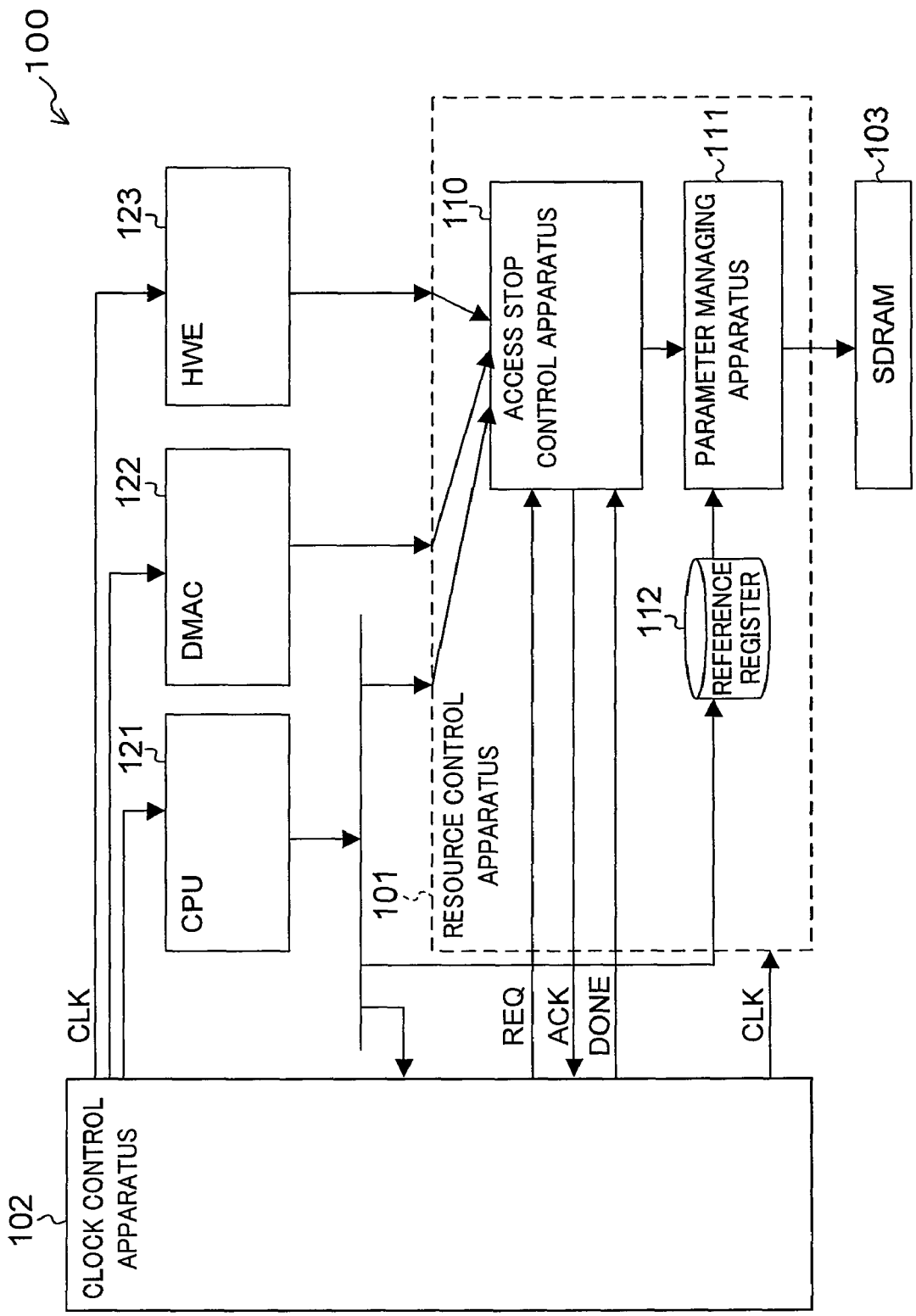
FIG. 1 is a block diagram showing a first exemplary configuration of a data processing apparatus according to the present invention.

FIG. 1 shows a data processing apparatus according to an embodiment of the present invention. In FIG. 1, the data processing apparatus 100 comprises a resource control apparatus 101, a clock control apparatus 102, an SDRAM 103

(resource), a Central Processing Unit (CPU) 121, a Direct Memory Access Controller (DMAC) 122, and a Hardware Engine (HWE) 123. The CPU 121, the DMAC 122, and the HWE 123 are master apparatuses each of which accesses the SDRAM 103. Also, the resource control apparatus 101 comprises an access stop control apparatus 110, a parameter managing apparatus 111, and a reference register 112. The clock control apparatus 102 supplies a clock (CLK) signal to circuits, such as the resource control apparatus 101, the CPU 121, the DMAC 122, and the HWE 123, included in the data processing apparatus 100. Also, the CPU 121 can access the clock control apparatus 102 and the reference register 112 as well as the SDRAM 103 to give an instruction to each of them.

The reference register 112 stores information, such as a minimum cycle interval from an active command to a write command to the SDRAM 103, a maximum cycle interval from an active command to a precharge command, and the like. For example, when the minimum cycle interval from an active command to a write command is set to be four, the parameter managing apparatus 111 performs a control so as to prevent the interval from an active command to a write command from being less than four.

Although three apparatuses, i.e., the CPU 121, the DMAC 122 and the HWE 123 are exemplified as master apparatuses that access the SDRAM 103, one or more of them may be provided in an actual configuration, or alternatively, two or more CPUs may be provided. A flash memory or the like may be used as a resource in addition to the SDRAM 103.

Figure 2:
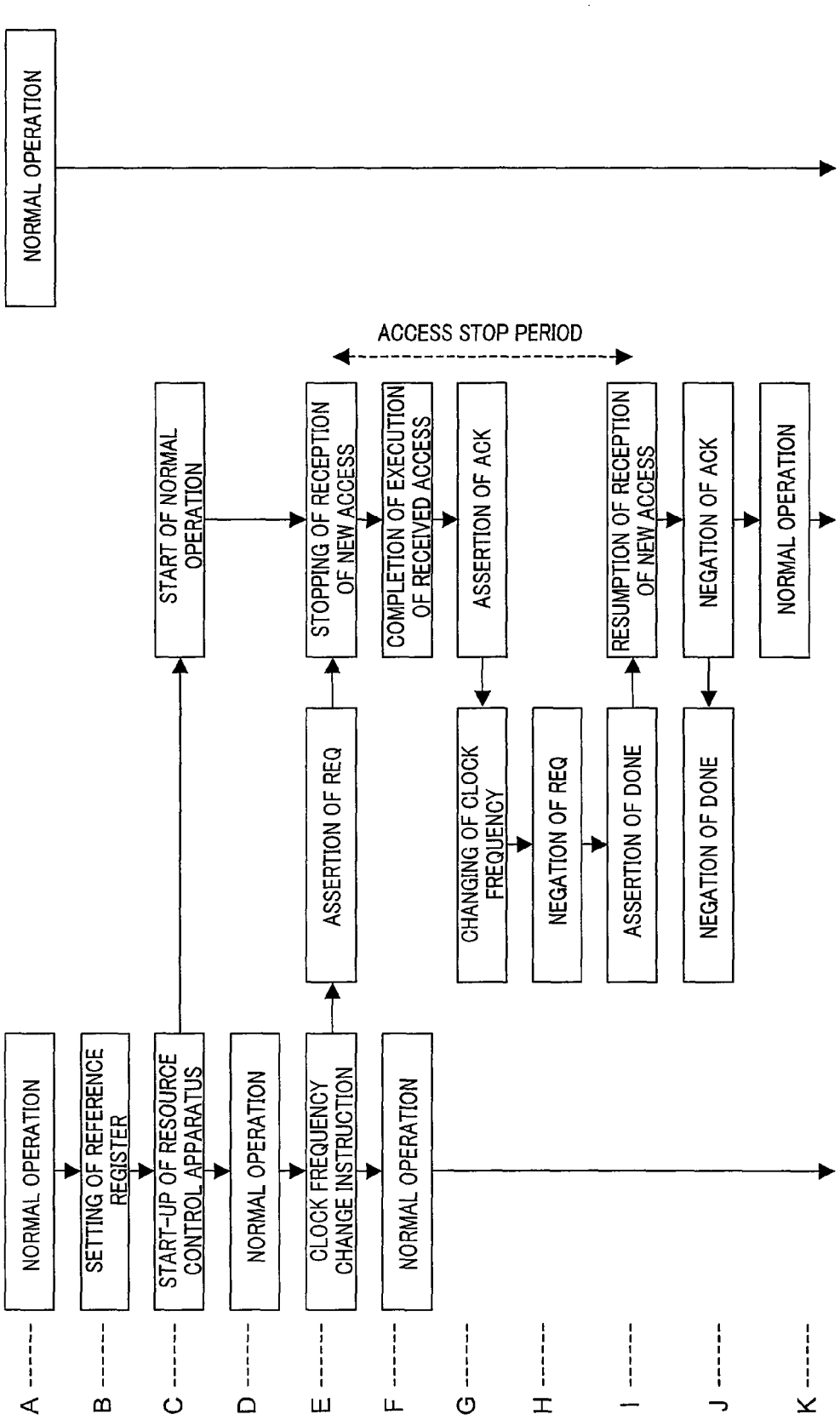
FIG. 2 is a flowchart showing an exemplary operation of the exemplary configuration of FIG. 1.

FIG. 2 shows an exemplary flow of an operation of each component when the frequency of a clock signal to the data processing apparatus 100 of FIG. 1 is changed. Hereinafter, the operations will be described with reference to FIG. 2.

It is assumed that the CPU 121, the DMAC 122 and the HWE 123 are operating at timing A. When the CPU 121 accesses the SDRAM 103, the CPU 121 makes required settings on the resource control apparatus 101 including the reference register 112 and the like at timing B, and thereafter, at timing C, instructs the resource control apparatus 101 to start up. The resource control apparatus 101 starts an operation in accordance with this instruction and enables the SDRAM 103 to be accessed. After instructing the resource control apparatus 101 to start up, the CPU 121 goes to a normal operating state at timing D. At this timing, any of the master apparatuses, i.e., the CPU 121, the DMAC 122 and the HWE 123, can access the SDRAM 103. In the resource control apparatus 101, the parameter managing apparatus 111 performs an access control by referencing a value in the reference register 112, so as to satisfy a constraint on an AC parameter of the SDRAM 103.

Next, when an application can be carried out even if a clock frequency with which the SDRAM 103 is accessed is decreased since, for example, the load of the application is reduced, the CPU 121 instructs the clock control apparatus 102 at timing E to change the clock frequency. When receiving this instruction, the clock control apparatus 102 asserts an REQ signal to the resource control apparatus 101. When receiving the REQ signal, the resource control apparatus 101 temporarily stops reception of a new access request from all the master apparatuses using the access stop control apparatus 110. In this state, it seems to each master apparatus that a reaction from the resource control apparatus 101 is temporarily stopped, however, the operation itself of each master apparatus actually does not stop. After the access stop control apparatus 110 stops reception of a new access, the resource control apparatus 101 executes an access request already received, and completes access to the SDRAM 103. The resource control apparatus 101 confirms completion of access to the already received access request at timing F, and asserts an ACK signal to the clock control apparatus 102 at timing G. In response to the assertion of the ACK signal, the clock control apparatus 102 decreases the frequency of a clock signal supplied to the resource control apparatus 101. In this case, the frequency of a clock signal supplied to another component, such as the CPU 121 or the like, may be simultaneously decreased at timing E, depending on the clock frequency change instruction from the CPU 121, or a clock signal to an component that is not being used may be stopped. Thereafter, the clock control apparatus 102 negates the REQ signal at timing H, and asserts a DONE signal at timing I. In response to the assertion of the DONE signal, the resource control apparatus 101 resumes reception of a new access from the master apparatuses.

Thereafter, the resource control apparatus 101 negates the ACK signal at timing J. Thereafter, the resource control apparatus 101 returns to a normal operation at timing K. The clock control apparatus 102 confirms at timing J that the ACK signal has been negated, and negates the DONE signal. The clock frequency and the power consumption of each component are lower in the state at timing K than in the state at timing D.

As described above, according to the example of FIGS. 1 and 2, when the data processing apparatus 100 goes to a low power consumption state that is achieved by decreasing the clock frequency, the clock frequency can be decreased without stopping the operation of each master apparatus. Therefore, even when the HWE 123 or the like is executing an application requiring real-timeness, the clock frequency can be decreased without interrupting the application. Also, since a period during which the SDRAM 103 cannot be accessed (timing E to timing I) is a considerably short period during which an application is executed by hardware, an influence on the application due to inability to access the SDRAM 103 can be suppressed to a low level. Also, particularly, after the issuance of the clock frequency change instruction at timing E, the CPU 121 does not need to execute a process for changing the clock frequency, and can execute another process, so that the operations of the DMAC 122 and the HWE 123 do not need to be stopped, and therefore, the execution procedure of the CPU 121 can be facilitated.

Although it has been assumed in this example that the clock frequency is decreased, the clock frequency may be increased. Alternatively, the present invention may be applied to a case where access to the SDRAM 103 is temporarily stopped without changing the clock frequency, or a case where Phase-Locked Loops (PLLS) that are clock supply sources are switched. Also, a method for allowing the resource control apparatus 101 and the clock control apparatus 102 to communicate with each other is not limited to the method of this example and may be other methods. For example, if a time or the number of clock cycles from assertion of an ACK signal of the resource control apparatus 101 to assertion of a DONE signal of the clock control apparatus 102 can be fixedly defined, a process may be carried out while fixedly waiting in the resource control apparatus 101, without transmitting or receiving a DONE signal. Also, the flow of FIG. 2 is not limited to the flow of this example. For example, the timing of changing of the clock frequency and the timing of negation of the REQ signal may be reversed.

Second Embodiment

Figure 3:
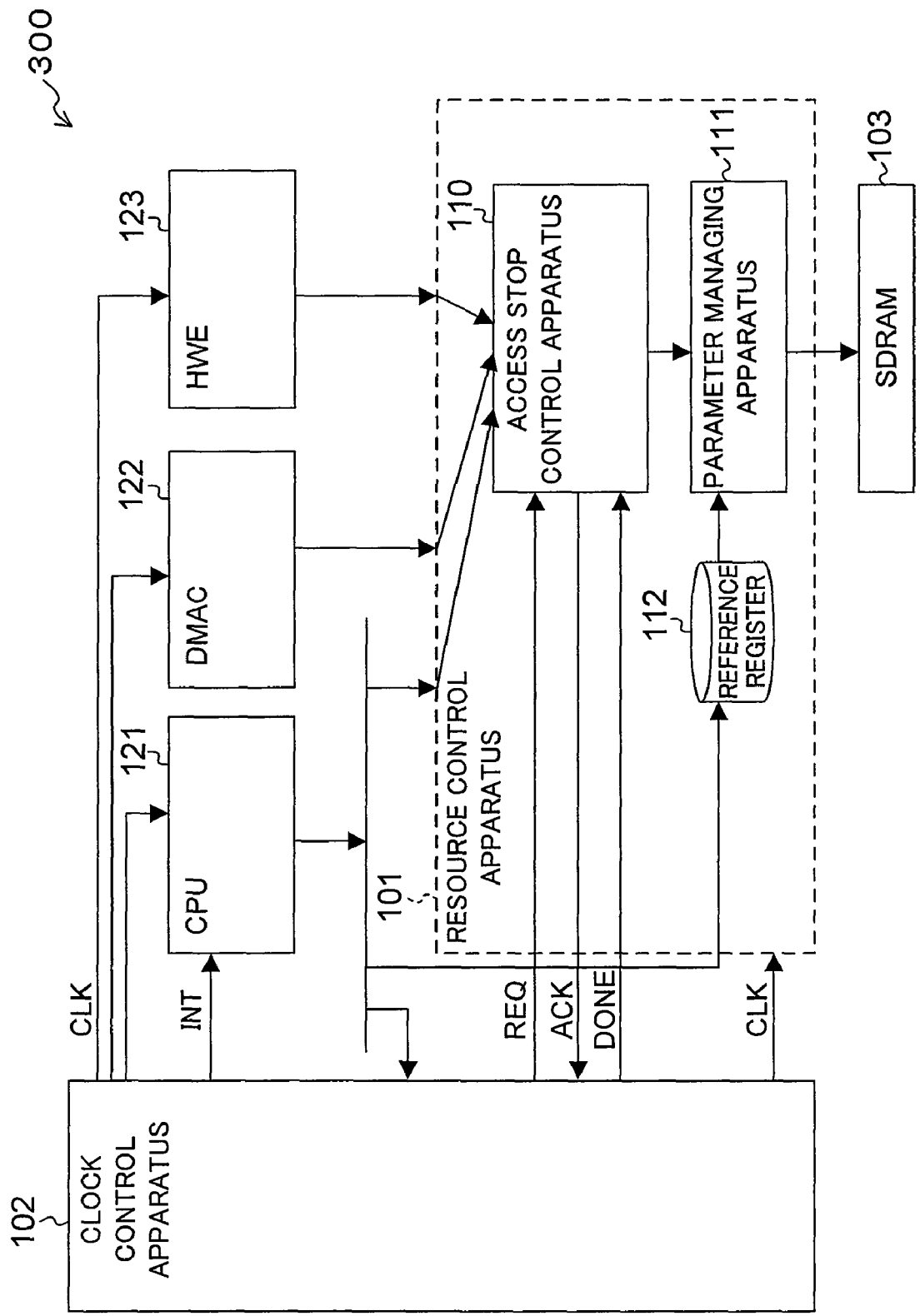
FIG. 3 is a block diagram showing a second exemplary configuration of the data processing apparatus of the present invention.

FIG. 3 shows a data processing apparatus according to an embodiment of the present invention. The components of FIG. 3 are the same as those of FIG. 1, except that an INT signal from the clock control apparatus 102 to the CPU 121 is added.

Figure 4:
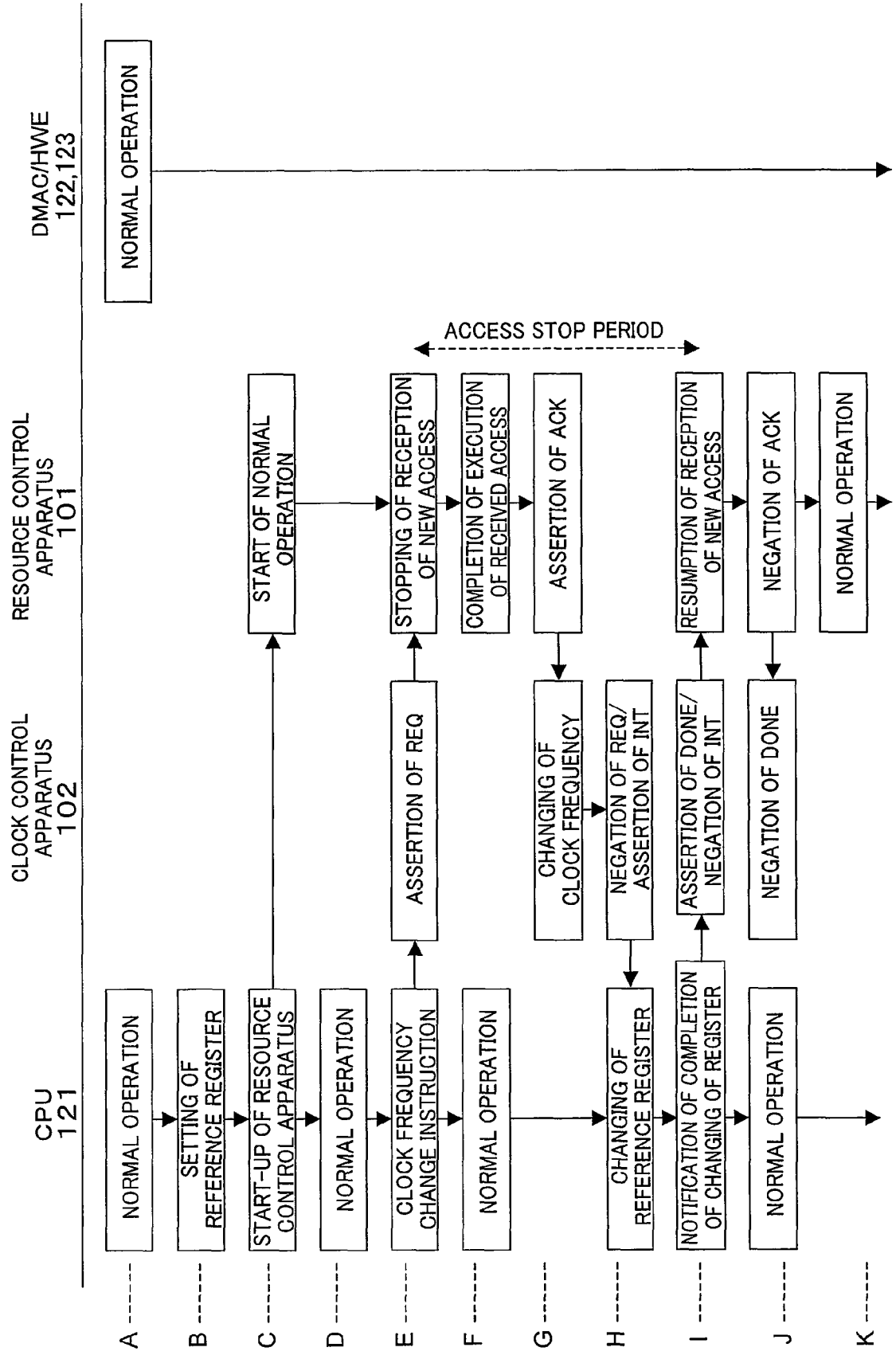
FIG. 4 is a flowchart showing an exemplary operation of the exemplary configuration of FIG. 3.

FIG. 4 shows an exemplary flow of an operation of each component when the frequency of a clock signal to the data processing apparatus 300 of FIG. 3 is changed. Hereinafter, the operations will be described with reference to FIG. 4.

The process until timing G is the same as that of the first embodiment. The clock control apparatus 102 asserts an INT signal simultaneously with negation of an REQ signal at timing H. The CPU 121 sets a value suitable for a changed clock frequency into the reference register 112 in accordance with the INT signal. After completion of changing of the reference register 112, the CPU 121 notifies the clock control apparatus 102 of the completion of changing of the reference register 112 at timing I. Thereafter, the clock control apparatus 102 asserts a DONE signal and negates the INT signal.

The resource control apparatus 101 starts reception of a new access in accordance with the DONE signal. In this case, the new access to the SDRAM 103 is controlled by the parameter managing apparatus 111 based on the changed value in the reference register 112. The CPU 121 returns to a normal operation at timing J. The following flow is similar to that of the first embodiment.

Thus, by changing a value in the reference register 112 using the CPU 121 partway through the clock frequency changing procedure, the SDRAM 103 can be controlled with a parameter suitable for the changed clock frequency, so that the efficiency of access to the SDRAM 103 can be improved.

Note that the INT signal may be an interrupt signal to the CPU 121. Alternatively, instead of connection of the INT signal, the CPU 121 may regularly confirm the state of the clock control apparatus 102. Also, the flow of the CPU 121 changing the reference register 112 is not limited to this example.

Third Embodiment

Figure 5:
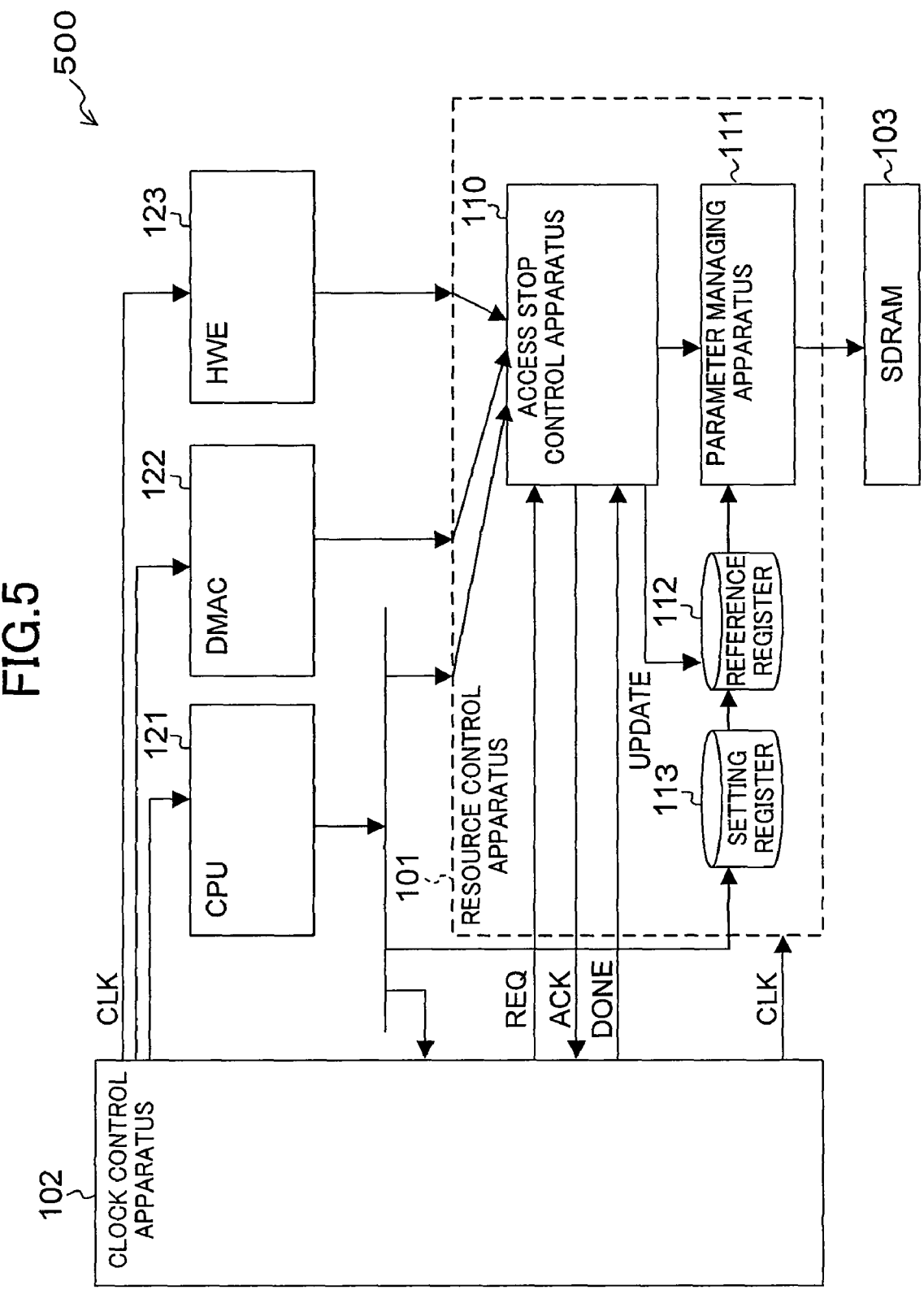
FIG. 5 is a block diagram showing a third exemplary configuration of the data processing apparatus of the present invention.

FIG. 5 shows a data processing apparatus according to an embodiment of the present invention. In FIG. 5, a setting register 113 is newly added to FIG. 1.

Figure 6:
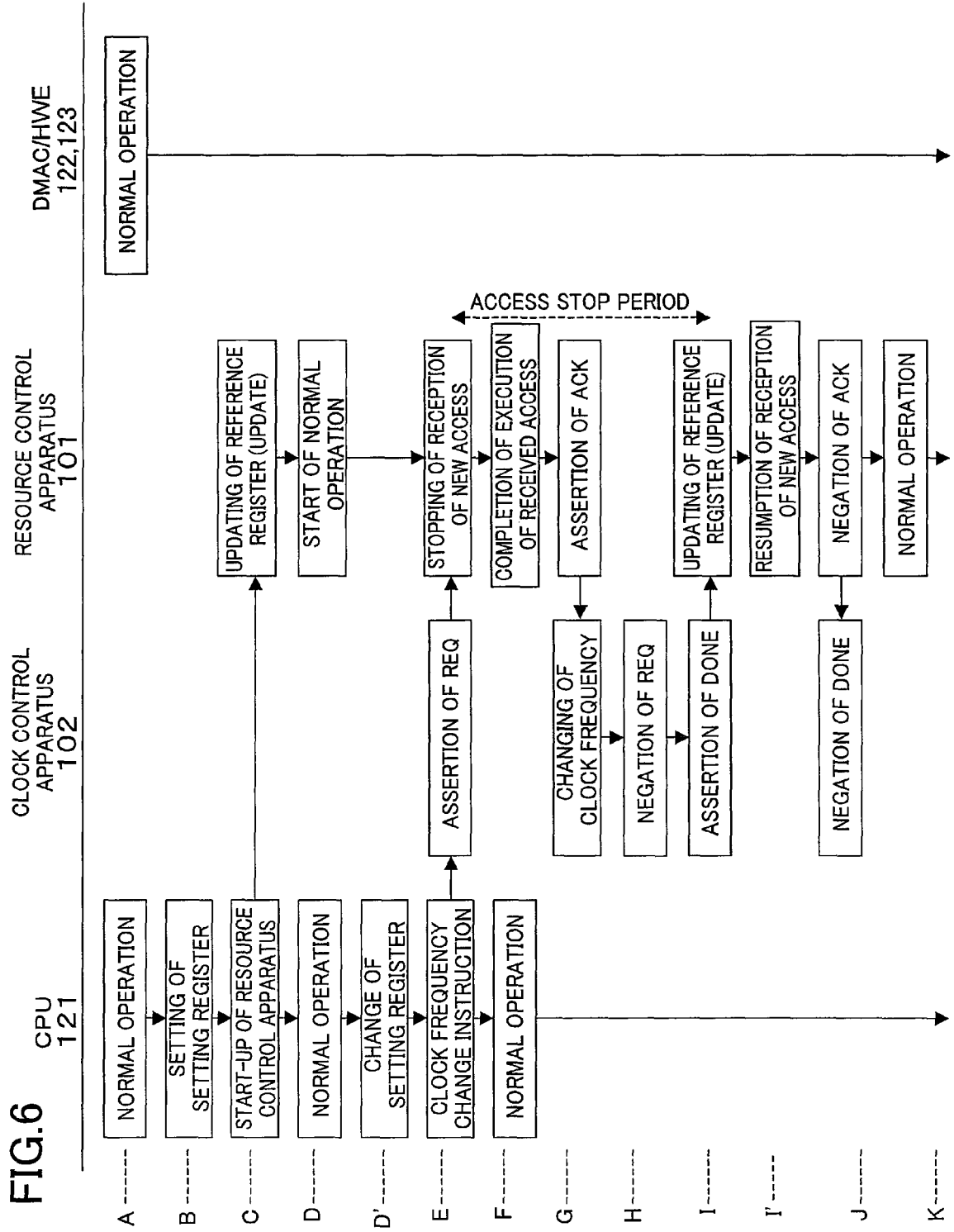
FIG. 6 is a flowchart showing an exemplary operation of the exemplary configuration of FIG. 5.

FIG. 6 shows an exemplary flow of an operation of each component when the frequency of a clock signal to the data processing apparatus 500 of FIG. 5 is changed. Hereinafter, the operations will be described with reference to FIG. 6.

The process at timing A is similar to that of the first embodiment. The CPU 121 sets a parameter for controlling the SDRAM 103 into the setting register 113 at timing B. When, at timing C, the CPU 121 instructs the resource control apparatus 101 to start up, the access stop control apparatus 110 outputs an UPDATE pulse, and the reference register 112 that has received the UPDATE pulse fetches the value in the setting register 113 and updates itself, in the resource control apparatus 101. At timing D, the CPU 121 returns to the normal operation, and the resource control apparatus 101 also performs the normal operation. In this case, the parameter managing apparatus 111 controls access to the SDRAM 103 in accordance with the setting that has been made by the CPU 121 at timing B.

When the clock frequency is changed, the CPU 121 updates the value in the setting register 113 to a value suitable for the changed clock frequency at timing D'. Thereafter, a clock frequency change instruction is given to the clock control apparatus 102 at timing E. The following process until timing H is similar to that of the first embodiment. At timing I, the clock control apparatus 102 asserts a DONE signal, and the access stop control apparatus 110 outputs an UPDATE pulse, and the reference register 112 fetches the value in the setting register 113 and updates itself, in the resource control apparatus 101. Thereafter, the resource control apparatus 101 resumes reception of a new access at timing I'. In this case, the parameter managing apparatus 111 controls the SDRAM 103 using a parameter suitable for the changed clock frequency. The following flow is similar to that of the first embodiment.

Thus, by providing the reference register 112 and the setting register 113 separately, a value in the reference register 112 can be changed to one that is suitable for a changed clock frequency without a setting from the CPU 121 partway through changing of the clock frequency. Therefore, a parameter for a control of the SDRAM 103 can be changed to a suitable value while a period during which access to the SDRAM 103 is stopped when the clock frequency is changed is suppressed to a minimum level.

Note that the timing of the UPDATE pulse is not limited to this example. For example, the timing of the UPDATE pulse may be the same as timing G at which the ACK signal is asserted, or may be other suitable timings. Also, the resource control apparatus 101 may be notified of information about a ratio of frequencies before and after changing at the same time when the REQ signal is asserted, in accordance with the clock frequency change instruction at timing E. In this case, when the reference register 112 is updated at timing I, the reference register 112 not only fetches a value in the setting register 113 as it is, but also may perform a calculation depending on the frequency ratio with respect to the value in the setting register 113 and update the reference register 112 with the resultant value.

Fourth Embodiment

Figure 7:
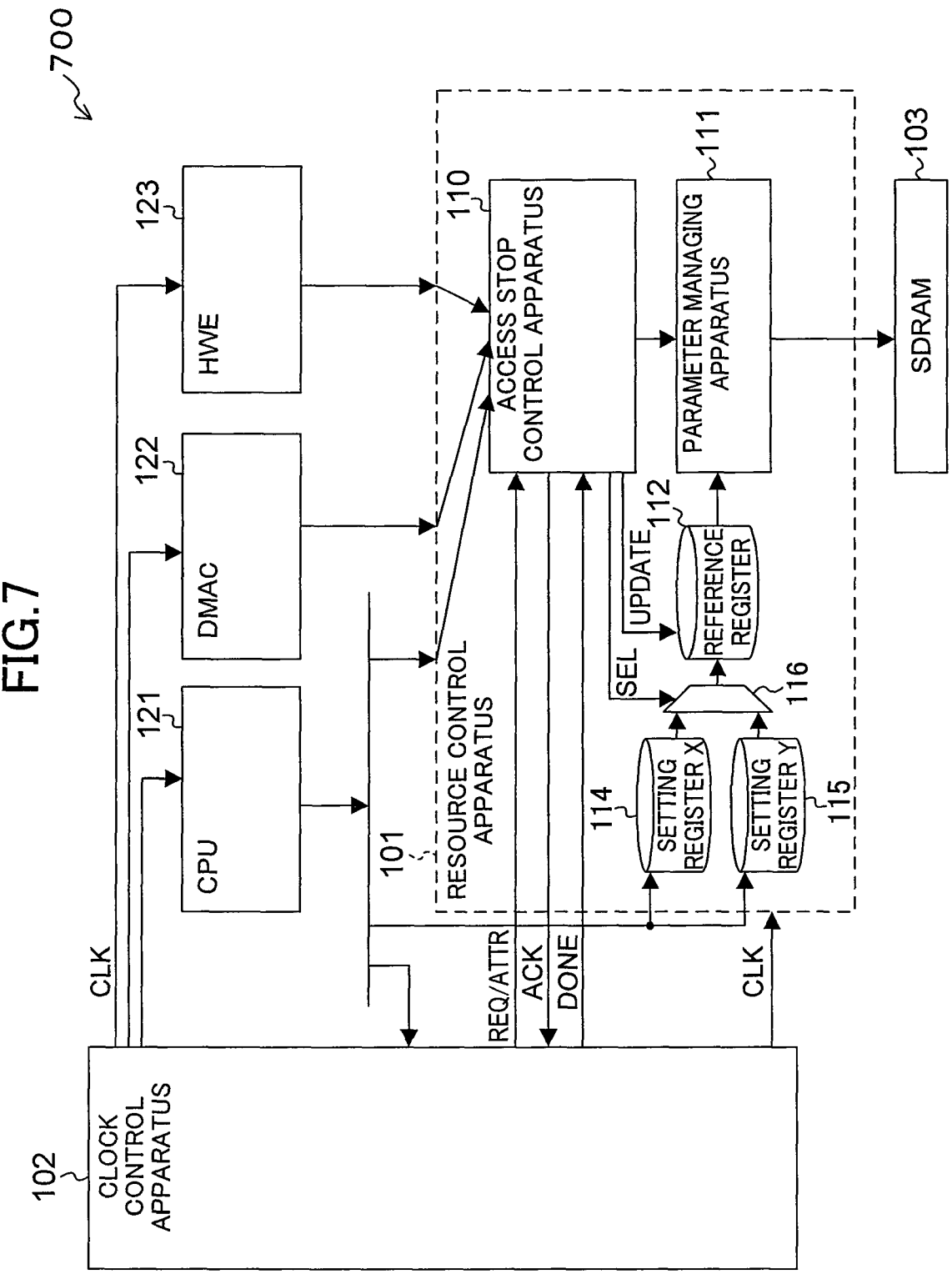
FIG. 7 is a block diagram showing a fourth exemplary configuration of the data processing apparatus of the present invention.

FIG. 7 shows a data processing apparatus according to an embodiment of the present invention. In FIG. 7, a setting register X 114, another setting register Y 115 and a selector 116 are newly added to FIG. 1.

Figure 8:
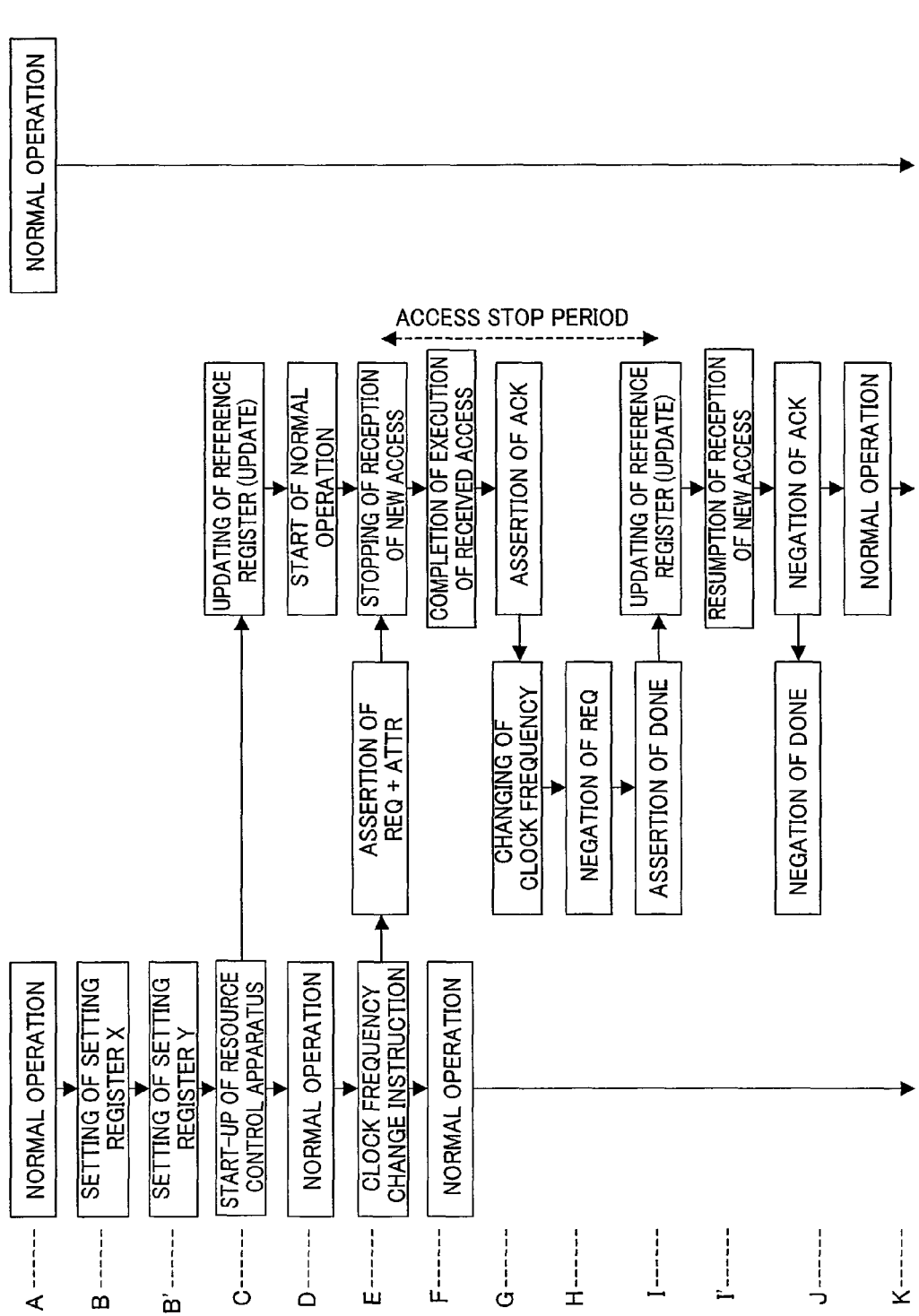
FIG. 8 is a flowchart showing an exemplary operation of the exemplary configuration of FIG. 7.

FIG. 8 shows an exemplary flow of an operation of each component when the frequency of a clock signal to the data processing apparatus 700 of FIG. 7 is changed. Hereinafter, the operations will be described with reference to FIG. 8.

The process until timing A is similar to that of the first embodiment. The CPU 121 sets a value of a parameter suitable for the frequency before changing into the setting register X 114 at timing B and a value of a parameter suitable for the frequency after changing into the setting register Y 115 at timing B'. When, at timing C, the CPU 121 instructs the resource control apparatus 101 to start up, an SEL signal is output so that the selector 116 selects the setting register X 114, and an UPDATE pulse is simultaneously output, in the resource control apparatus 101. Thereby, the reference register 112 is updated with a value in the setting register X 114. The CPU 121 and the resource control apparatus 101 go to their normal operations at timing D. In this case, the parameter managing apparatus 111 controls access to the SDRAM 103 based on the value in the setting register X 114 fetched by the reference register 112. The CPU 121 gives a clock frequency change instruction to the clock control apparatus 102 at timing E, and the clock control apparatus 102 asserts an REQ signal to the resource control apparatus 101. At the same time, the clock control apparatus 102 outputs changed clock frequency information as an ATTR signal, and the resource control apparatus 101 determines, in accordance with the ATTR signal, that the setting register Y 115 is optimal as a parameter for the changed clock frequency. When receiving the REQ signal from the clock control apparatus 102, the resource control apparatus 101 stops reception of a new access from the master apparatuses. The CPU 121 returns to the normal operation at timing F. The resource control apparatus 101 completes execution of access already received before stopping reception of a new access, and asserts an ACK signal to the clock control apparatus 102 at timing G. The clock control apparatus 102 receives the ACK signal, changes the clock frequency, and at timing H, negates the REQ signal. At timing I, the clock control apparatus 102 asserts a DONE signal, and when the resource control apparatus 101 receives the DONE signal, an SEL signal is output so that the selector 116 selects the setting register Y 115, and an UPDATE pulse is output. Thereby, the reference register 112 updates itself with a value in the setting register Y 115. The resource control apparatus 101 resume reception of a new access at timing I', negates the ACK signal at timing J, and returns to the normal operation at timing K. In this case, the parameter managing apparatus 111 controls the SDRAM 103 based on the value in the setting register Y 115 fetched by the reference register 112. After confirming negation of the ACK signal, the clock control apparatus 102 negates the DONE signal at timing J.

Thus, by providing a plurality of setting registers (114 and 115), it is not necessary for the CPU 121 to set the setting registers when the clock frequency is changed, so that the procedure for changing the clock frequency is further facilitated.

Note that the flow of FIG. 8 is only for illustrative purposes and the present invention is not limited to this. Also, although there are two setting registers in this example, the number of setting registers may be three or more in accordance with clock frequencies.

Fifth Embodiment

Figure 9:
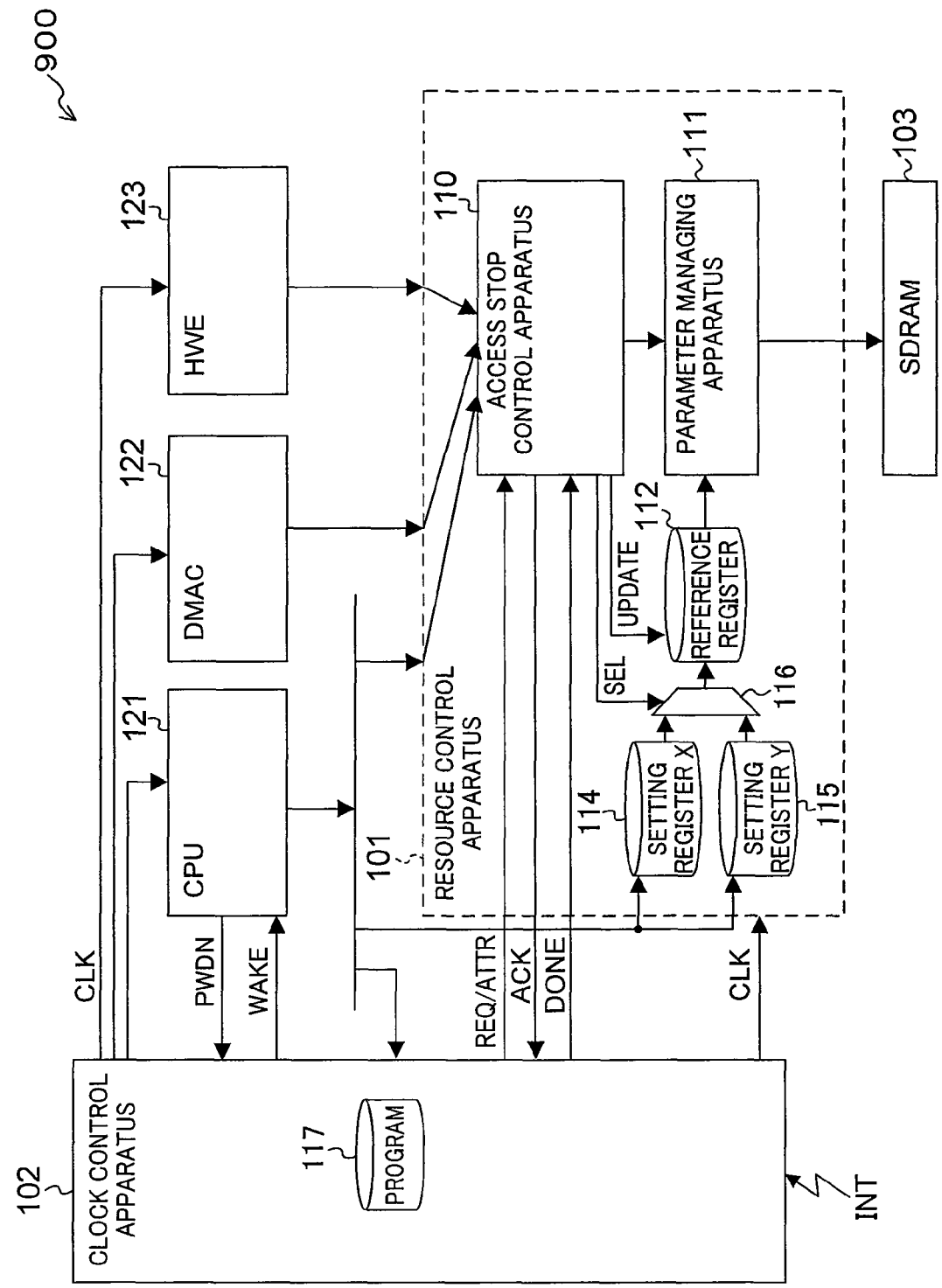
FIG. 9 is a block diagram showing a fifth exemplary configuration of the data processing apparatus of the present invention.

FIG. 9 shows a data processing apparatus according to an embodiment of the present invention. In FIG. 9, programming information 117 is newly added to the clock control apparatus 102 of FIG. 7.

FIGS. 10 and 11 show an exemplary flow of an operation of each component when the frequency of a clock signal to the data processing apparatus 900 of FIG. 9 is changed. Hereinafter, the operations will be described with reference to FIGS. 10 and 11.

The process until timing A is similar to that of the first embodiment. The CPU 121 sets parameters suitable for clock frequencies before and after changing into the setting register X 114 and the setting register Y 115 at timing B. At timing C, the CPU 121 instructs the resource control apparatus 101 to start up, and the resource control apparatus 101 outputs an UPDATE pulse while outputting an SEL signal so that the setting register X 114 is selected, and the reference register 112 updates itself with the value in the setting register X 114. The CPU 121 and the resource control apparatus 101 perform their normal operations at timing D.

In general, when an application that does not require a CPU is executed, the CPU goes to a SLEEP state, i.e., a low power consumption state. In this case, a signal indicating that the CPU is in the low power consumption state and reception of a start-up signal, such as an interrupt signal or the like, is being performed may be output. Assuming that the CPU 121 of FIG. 9 is such a CPU, the clock control apparatus 102 is programmed (programmed setting) to reduce the frequency of a clock signal to the resource control apparatus 101 when the CPU 121 goes to the SLEEP state at timing E. Thereafter, the CPU 121 outputs a PWDN signal at timing E' before going to the SLEEP state. In response to the output of the PWDN signal, the clock control apparatus 102 in the programmed state asserts an REQ signal and outputs, as an ATTR signal, a value indicating that the setting register Y 115 is to be selected. The resource control apparatus 101 stops reception of a new access from the master apparatuses. The CPU 121 goes to the SLEEP state at timing F. The operations from timing F to timing K of the clock control apparatus 102 and the resource control apparatus 103 are similar to those of the fourth embodiment.

The following flow will be described with reference to FIG. 11. FIG. 11 shows a flow from the SLEEP state back to the normal state of the CPU 121. A process at timing L is similar to the process at timing K of FIG. 10. At timing M, the clock control apparatus 102 receives an INT signal that causes the CPU 121 to return from the SLEEP state to the normal state. The INT signal may be an interrupt signal or other signals to the CPU 121. After receiving the INT signal, the clock control apparatus 102 asserts an REQ signal and outputs an ATTR signal having a value indicating that the setting register X 114 is to be selected, at timing N. The process from timing N to timing S is similar to the process from timing E to timing I' of FIG. 8. Note that, at timing R, when an UPDATE pulse is output, an SEL signal having a value that allows the setting register X 114 to be selected is output. At timing T, the resource control apparatus 101 negates the ACK signal, and the clock control apparatus 102 negates the DONE signal and outputs a WAKE signal to the CPU 121. The CPU 121 returns from the SLEEP state to the normal state in accordance with the WAKE signal. The resource control apparatus 101 goes to the normal state at timing U.

Thus, by automatically changing the clock frequency using hardware in association with the state transition of the CPU 121, the whole data processing apparatus 900 can go to the low power consumption state and returns to the normal state when the CPU 121 goes to the low power consumption state and returns to the normal state, respectively.

Note that the flow of FIGS. 10 and 11 is only for illustrative purposes and the present invention is not limited to this. The number of CPUs is not limited to one. Based on PWDN signals of a plurality of CPUs, it may be determined whether the clock frequency is to be changed. The programming information 117 may not be used, and in this case, the clock frequency may be changed every time the CPU 121 outputs a PWDN signal. Alternatively, the programming information 117 may include information about changed clock frequencies, and the changed clock frequencies may be selected. Alternatively, after confirming that the CPU 121 has received an INT signal, the PWDN signal has been negated, and the CPU 121 has returned from the low power consumption state to the normal state, the clock control apparatus 102 may assert an REQ signal to the resource control apparatus 101, and thereafter, the process after timing N may be performed.

As described above, the data processing apparatus of the present invention is allowed to change the clock frequency even during execution of an application requiring real-timeness, so that the power consumption of the whole system can be reduced, and therefore, can be suitably used for a system LSI or the like.

What is claimed is:
1. A data processing apparatus comprising:
  at least one master apparatus;
  a SDRAM to be accessed by the master apparatus;
  a resource control apparatus for controlling access from the master apparatus to the SDRAM; and
  a clock control apparatus for controlling a clock signal supplied to the resource control apparatus, wherein the resource control apparatus has an access stop control apparatus for temporarily stopping reception of an access request from the master apparatus to the SDRAM, and the clock control apparatus changes the clock signal supplied to the resource control apparatus when access to the SDRAM is not being performed, wherein the resource control apparatus further includes:
- a reference register for holding a parameter for controlling a command for access to the SDRAM; and
- a parameter managing apparatus for managing a control of the SDRAM in accordance with a value in the reference register.

2. The data processing apparatus of claim 1, wherein the master apparatus sets the parameter held by the reference register based on a frequency of the clock signal changed by the clock control apparatus.

3. The data processing apparatus of claim 1, wherein the resource control apparatus further includes:
- a setting register for setting the parameter, and
- the resource control apparatus updates a value in the reference register based on a value in the setting register when access to the SDRAM is not being performed.

4. The data processing apparatus of claim 3, wherein
the resource control apparatus has a plurality of the setting registers corresponding to clock frequencies supplied to the resource control apparatus,
the clock control apparatus previously notifies the resource control apparatus of clock frequency information, and
the resource control apparatus updates a value in the reference register based on a value in the setting register corresponding to the clock frequency to be changed, when access to the SDRAM is not being performed.

5. The data processing apparatus of claim 3, wherein
the clock control apparatus previously notifies the resource control apparatus of clock frequency information, and
the resource control apparatus calculates a changed value based on a value in the setting register, corresponding to the notified clock frequency by the clock control apparatus, and updates a value in the reference register with the calculated value when access to the SDRAM is not being performed.

6. The data processing apparatus of claim 3, wherein
the master apparatus outputs a signal indicating transition to a low power consumption state,
the resource control apparatus stops reception of an access request from the master apparatus after the master apparatus goes to a low power consumption state, and
the clock control apparatus changes a frequency of the clock signal when access to the SDRAM is not being performed.

7. The data processing apparatus of claim 6, wherein
the resource control apparatus stops reception of an access request from the master apparatus after the master apparatus goes from a low power consumption state to a normal operating state, and
the clock control apparatus changes the clock frequency changed by the clock control apparatus when access to the resource SDRAM is not being performed.

8. The data processing apparatus of claim 6, wherein
the resource control apparatus stops reception of an access request from the master apparatus before the master apparatus goes from a low power consumption state to a normal state, and
the clock control apparatus changes the clock frequency changed by the clock control apparatus, and thereafter, the master apparatus goes from a low power consumption state to a normal state, when access to the SDRAM is not being performed.

9. The data processing apparatus of claim 1, wherein the master apparatus does not stop an access request to the SDRAM when reception of an access request to the SDRAM is stopped.

* * * * *